United States Patent
Casoni et al.

(10) Patent No.: US 12,201,873 B2
(45) Date of Patent: Jan. 21, 2025

(54) TREADMILL WITH AXIAL ELECTRIC MOTOR

(71) Applicant: Technogym S.P.A, Cesena (IT)

(72) Inventors: Massimiliano Casoni, Cesena (IT); Alessandro Del Monaco, Cesena (IT); Davide Gatti, Cesena (IT)

(73) Assignee: Technogym S.p.A, Cesena FC (IT)

( * ) Notice: Subject to any disclaimer, the term of this patent is extended or adjusted under 35 U.S.C. 154(b) by 717 days.

(21) Appl. No.: 16/976,119

(22) PCT Filed: Feb. 27, 2019

(86) PCT No.: PCT/IT2019/050043
§ 371 (c)(1),
(2) Date: Aug. 27, 2020

(87) PCT Pub. No.: WO2019/167095
PCT Pub. Date: Sep. 6, 2019

(65) Prior Publication Data
US 2021/0001168 A1 Jan. 7, 2021

(30) Foreign Application Priority Data
Feb. 28, 2018 (IT) .................. 102018000003111

(51) Int. Cl.
*A63B 22/02* (2006.01)
*A63B 21/005* (2006.01)
(Continued)

(52) U.S. Cl.
CPC ...... *A63B 22/0235* (2013.01); *A63B 21/0051* (2013.01); *A63B 21/0058* (2013.01);
(Continued)

(58) Field of Classification Search
CPC ............ A63B 22/0235; A63B 21/0058; A63B 21/0051; A63B 22/02; A63B 22/0257; H02K 7/003
See application file for complete search history.

(56) References Cited

U.S. PATENT DOCUMENTS

| 5,607,376 A | 3/1997 | Magid |
| 5,619,087 A | 4/1997 | Sakai |
(Continued)

FOREIGN PATENT DOCUMENTS

| CN | 102107064 | 6/2011 |
| CN | 202183716 | 4/2012 |
(Continued)

OTHER PUBLICATIONS

International Search Report and the Written Opinion Dated Jul. 26, 2019 From the International Searching Authority Re. Application No. PCT/IT2019/050043. (14 Pages).
(Continued)

*Primary Examiner* — Megan Anderson
*Assistant Examiner* — Sara K. Conway

(57) ABSTRACT

A gymnastic machine including a base structure having a front transmission assembly and a rear transmission assembly, the base structure includes two lateral longitudinal members between which a sliding belt slides. The sliding belt, associated with the base structure, on which a user can perform a gymnastic exercise, is configured to rotate by the front transmission assembly and the rear transmission assembly according to a sliding direction, wherein the sliding belt is arranged between the two lateral longitudinal members. An electric motor, having at least a stator and at least a rotor, is included. The electric motor is kinematically coupled to the front transmission assembly, or to the rear
(Continued)

transmission assembly, for moving the sliding belt. The electric motor is of axial type.

16 Claims, 7 Drawing Sheets

(51) Int. Cl.
    *H02K 1/2793*     (2022.01)
    *H02K 1/2795*     (2022.01)
    *H02K 7/00*     (2006.01)
    *H02K 7/02*     (2006.01)
    *H02K 7/10*     (2006.01)
    *H02K 21/24*     (2006.01)

(52) U.S. Cl.
    CPC ......... *H02K 1/2793* (2013.01); *H02K 1/2795* (2022.01); *H02K 7/003* (2013.01); *H02K 7/02* (2013.01); *H02K 7/1004* (2013.01); *H02K 21/24* (2013.01); *A63B 22/0242* (2013.01)

(56) References Cited

U.S. PATENT DOCUMENTS

| | | |
|---|---|---|
| 6,302,826 B1 | 10/2001 | Lee |
| 6,455,960 B1 | 9/2002 | Trago et al. |
| 6,575,879 B1 | 6/2003 | Harney et al. |
| 6,879,078 B2 | 4/2005 | Wolters |
| 7,362,016 B2 | 4/2008 | Cheng |
| 7,618,352 B1 | 11/2009 | Wei |
| 8,282,535 B2 | 10/2012 | Huang |
| 10,093,487 B2 | 10/2018 | Ramezani |
| 10,238,911 B2 * | 3/2019 | Bayerlein ........... A63B 21/0054 |
| 10,554,082 B2 * | 2/2020 | Watanabe ............... H02K 16/02 |
| 11,123,602 B2 | 9/2021 | Kueker |
| 2010/0331148 A1 | 12/2010 | Huang |
| 2012/0133231 A1 * | 5/2012 | Hayakawa ............. H02K 21/24 |
| | | 310/156.37 |
| 2013/0049512 A1 | 2/2013 | Jung |
| 2016/0308411 A1 | 10/2016 | Watanabe et al. |
| 2017/0170706 A1 * | 6/2017 | Bhargava ............... H02K 21/12 |
| 2017/0305676 A1 | 10/2017 | Ramezani |
| 2018/0001134 A1 | 1/2018 | Bayerlein et al. |
| 2019/0217182 A1 | 7/2019 | Kucker et al. |
| 2021/0001168 A1 | 1/2021 | Casoni et al. |
| 2021/0086026 A1 | 3/2021 | Casoni et al. |

FOREIGN PATENT DOCUMENTS

| | | |
|---|---|---|
| CN | 207871377 | 9/2018 |
| TW | 463644 | 11/2001 |
| TW | 200642717 | 12/2006 |
| TW | 201310868 | 3/2013 |
| WO | WO 2017/123441 | 7/2017 |
| WO | WO 2019/167095 | 9/2019 |
| WO | WO 2019/167096 | 9/2019 |

OTHER PUBLICATIONS

Rapporto di Ricerca e Opinione Scritta [Search Report and Written Opinion] Dated Nov. 11, 2018 From the Ministero Dello Sviluppo Economico, Direzione Generale Sviluppo Produttivo e Competitivita, Ufficion Italiano Brevetti e Marchi Re. Application No. IT201800003111. (7 Pages).
International Search Report and the Written Opinion Dated Jul. 26, 2019 From the International Searching Authority Re. Application No. PCT/IT2019/050044. (14 Pages).
Official Action Dated Sep. 21, 2023 from the US Patent and Trademark Office Re. U.S. Appl. No. 16/976,094. (39 pages).
Rapporto di Ricerca e Opinione Scritta [Seach Report and Written Opinion] Dated Nov. 12, 2018 From the Ministero Dello Sviluppo Economico, Direzione Generale Sviluppo Produttivo e Competitivita, Uffico Italiano Brevetti e Marchi Re. Application No. IT201800003113. (7 Pages).
Official Action Dated Mar. 28, 2024 from the US Patent and Trademark Office Re. U.S. Appl. No. 16/976,094. (45 pages).
Communication Pursuant to Article 94(3) EPC Dated Apr. 5, 2023 From the European Patent Office Re. Applciation No. 19709806.4. (6 Pages).
Decision of Examination Dated Aug. 18, 2022 From the Intellectual Property Office, Ministry of Economic Affairs of the Republic of Taiwan, R.O.C. Re. Application No. 11120697990 together with Translation into English. (18 Pages).
Decision of Examination Dated Aug. 18, 2022 From the Intellectual Property Office, Ministry of Economic Affairs of the Republic of Taiwan, R.O.C. Re. Application No. 11120700020 together with Translation into English (25 Pages).
Examination and Search Report Dated Jul. 15, 2022 From the Intellectual Property Office, Ministry of Economic Affairs of the Republic of Taiwan, R.O.C. Re. Application No. 108107078 and Its Translation Into English. (18 Pages).
Official Action Dated Sep. 24, 2024 from the US Patent and Trademark Office Re. U.S. Appl. No. 16/976,094. (32 pages).

\* cited by examiner

TREADMILL WITH AXIAL ELECTRIC MOTOR

RELATED APPLICATIONS

This application is a National Phase of PCT Patent Application No. PCT/IT2019/050043 having International filing date of Feb. 27, 2019, which claims the benefit of priority of Italian Patent Application No. 102018000003111 filed on Feb. 28, 2018. The contents of the above applications are all incorporated by reference as if fully set forth herein in their entirety.

FIELD AND BACKGROUND OF THE INVENTION

The present invention relates to an improved gymnastic machine with a closed circuit sliding belt.

In greater detail, the invention concerns a gymnastic machine with a closed circuit sliding belt which is an exercise surface and which enables the user to carry out gymnastic exercises such as running, walking and the like, wherein the gymnastic machine includes technical solutions that make it very compact.

In these gymnastic machines, the sliding belt is moved by an electric motor, which moves a front or rear transmission shaft on the machine.

This type of gymnastic machine is designed and realised in particular for carrying out gymnastic exercises, such as running or walking, where the user carrying out the exercise imparts an active force.

The description below relates to a sliding belt machine for carrying out walking and running exercises, but it is very clear that the same should not be considered limited to this specific use.

As is well-known, at present there exist gymnastic machines with a sliding belt comprising electric motors which set the sliding belt in rotation.

The electric motors at present installed on gymnastic machines with sliding belt of known type comprise complex kinematic chains, and rigid mechanisms for transformation and transmission of the motion that lead to large volumes and high degrees of wear among the parts.

Consequently, the overall external structure of the gymnastic machine has considerable dimensions.

This leads to the machines being rather voluminous. This leads to a need to reserve adequate space in professional environments where the gymnastic machine is installed, such as gymnasia and the like.

In the domestic environment, on the other hand, the need to save space is even more essential.

A further disadvantage of gymnastic machines comprising electric motors of known type is due to yielding and wear of the mechanical components the known motor is made up of.

A still further disadvantage of gymnastic machines of known type is the fact that the electric motors installed reach maximum efficiency at a high revolution count and limited motor torques, so as to limit volumes, so it is not possible to couple the motor directly to the front or rear shaft.

In effect, in order to house the electric motors at present installed in these types of gymnastic machines, typically having a magnetic flow of radial type, it is necessary to include housings, with a relative hood, usually arranged forward of the sliding belt, which consequently increases the surface that the machine occupies.

Radial-flow motors, for this type of machine, are in general utilised for reasons of power and inertia. In particular, as regards the inertia, it must be prevented that while a user is walking on the belt and accidentally switches the machine off, the belt itself blocks immediately, thus risking loss of balance for the user. On the other hand, it is advantageous to preserve a part of inertia in movement, so as to make more gradual the speed variation of the belt and so as to gradually enable the user to adapt to said changes.

SUMMARY OF THE INVENTION

In light of the above, the aim of the present invention is therefore to provide an improved gymnastic machine with sliding belt having a smaller volume.

A further aim of the present invention is to provide a gymnastic machine with a sliding belt which requires fewer maintenance interventions.

It is therefore a specific object of the present invention to provide a gymnastic machine comprising a base structure having a front transmission assembly and a rear transmission assembly, wherein said base structure comprises two lateral longitudinal members between which a sliding belt slides, a sliding belt, associated to said base structure, on which a user can perform a gymnastic exercise, wherein said sliding belt is configured to rotate by means of said front transmission assembly and said rear transmission assembly according to a sliding direction, wherein said sliding belt is arranged between said two lateral longitudinal members. The gymnastic machine also comprising an electric motor, having at least a stator and at least a rotor, said electric motor being kinematically coupled to said front transmission assembly, or to said rear transmission assembly, for moving said sliding belt, said gymnastic machine being characterized in that said electric motor is of axial type.

Always according to the invention, said stator may be directly or indirectly fixed to one of said lateral longitudinal members.

Still according to the invention, said at least one stator may comprise a plurality of electric coils, and said electric motor may comprise a drive shaft rotatably coupled to said stator.

Further according to the invention, said electric motor may comprise a first rotor, provided with a plurality of permanent magnets, keyed to said drive shaft, and a second rotor, provided with a plurality of permanent magnets, keyed to said drive shaft.

Advantageously according to the invention, said rear transmission assembly may comprise a rear shaft, and said first rotor may be coupled to said rear shaft.

Always according to the invention, said first rotor and said second rotor may be keyed on said drive shaft and said stator may be arranged between said first rotor and second rotor.

Still according to the invention, said drive shaft may be coupled to said rear shaft by means of coupling elements or shape couplings.

Further according to the invention, said first rotor may comprise a hub for coupling between said rear shaft and said electric motor, and said second rotor may be keyed on said hub.

Advantageously according to the invention, said first rotor may be provided with a smooth portion and a toothed portion for coupling with said sliding belt.

Always according to the invention, said machine may comprise transmission means for transmission of the drive of said electric motor to said rear transmission assembly.

Still according to the invention, said rear transmission assembly may comprise a rear shaft, and said transmission means may comprise a transmission belt and a transmission pulley, solidly coupled to said rear shaft.

Further according to the invention, said lateral longitudinal member may have a vertical wall having an opening, and said electric motor may be installed at said opening, so as to enable passage of said drive shaft.

Advantageously according to the invention, said lateral member may comprise two supports arranged on the sides of said opening.

Always according to the invention, said electric motor may comprise a casing, having a first flange, for fixing said electric motor to said vertical wall of said lateral longitudinal member.

Still according to the invention, said machine may comprise a lateral adjustment second flange, for the adjustment of the position of said electric motor with respect to one of said supports.

Further according to the invention, said machine may comprise a rear portion of said electric motor is inserted through said opening afforded on said vertical wall of said lateral longitudinal member.

Advantageously said at least one rotor may have a greater mass in the perimeter portion, to increase the inertia.

BRIEF DESCRIPTION OF THE SEVERAL VIEWS OF THE DRAWINGS

The present invention is now described, by way of example and without limiting the scope of the invention, with particular reference to the accompanying drawings, in which.

The similar parts will be indicated in the various drawings with the same numerical references.

DESCRIPTION OF SPECIFIC EMBODIMENTS OF THE INVENTION

Figure 1:
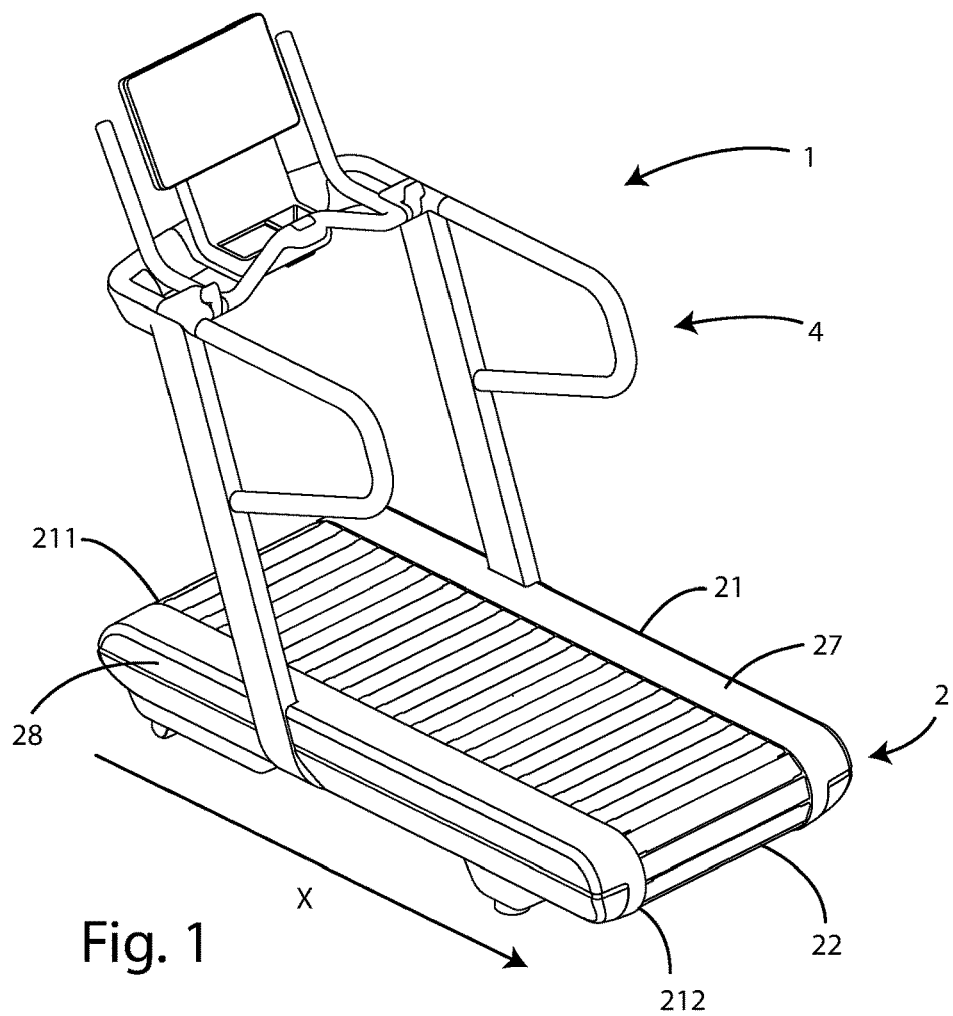
FIG. 1 is an axonometric side view of the improved gymnastic machine with a sliding belt, object of the present invention.
Figure 2:
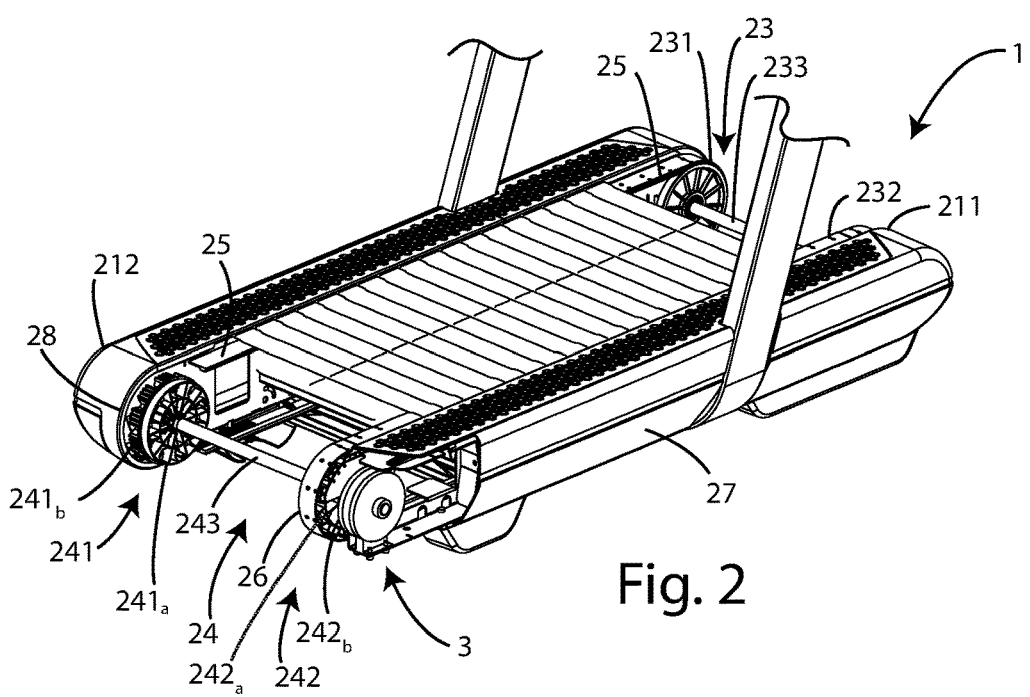
FIG. 2 shows a partially-exploded axonometric side view of a detail of a first embodiment of the machine of FIG. 1.

With reference to FIGS. 1 and 2, the improved gymnastic machine 1 with closed circuit sliding belt of the present invention is illustrated.

Said gymnastic machine 1 essentially comprises a base structure 2, having a frame 21, comprising a first end 211 and a second end 212.

The frame 21 also comprises two lateral longitudinal members 27 and 28 that are parallel and between which a sliding belt 22 is mounted, according to a sliding direction indicated by the axis X, which goes from said first end 211 towards the second end 212, by means of the drive force provided by an electric motor 3.

The gymnastic machine 1 further comprises a rest structure 4, coupled to said base structure 2, used by the user as a rest during the carrying-out of the gymnastic exercises.

Said sliding belt 22, also known as a slat conveyor belt due to the conformation of the exercise surface, comprises a plurality of slats flanked one following another according to a transversal direction to the sliding direction X of said sliding belt 22 and hinged to one another.

Each of said slats of said sliding belt 22 is rested on and fixed to a first belt 25 and a second belt 26.

Said sliding belt 22 is moved by means of a front transmission assembly 23 arranged at said first end 211 of said frame 21, and a rear transmission assembly 24, arranged at said second end 212 of said frame 21.

In particular, said front transmission assembly 23 comprises a first front pulley 231 and a second front pulley 232 and a front shaft 233 to which said first front pulley 231 and second front pulley 232 are fixed.

Likewise, said rear transmission assembly 24 comprises a first rear pulley 241, and a second rear pulley 242 keyed to a rear shaft 243.

Said first rear pulley 241 has an external surface which has a smooth portion $241_a$ and a toothed portion $241_b$.

Likewise, said second rear pulley 242 has an external surface which has a smooth portion $242_a$ and a toothed portion $242_b$.

Said front transmission assembly 23 and rear transmission assembly 24 are connected to one another respectively by means of said first belt 25 and second belt 26.

In particular, said first belt 25 is coupled to said first front pulley 231 and first rear pulley 241, while said second belt 26 is coupled to said second front pulley 232 and second rear pulley 242.

Said first belt 25 comprises a smooth internal portion, which slides on said first front pulley 231 and on the smooth portion $241_a$ of said first rear pulley 241, and an external toothed portion engaged on said toothed portion $241_b$ of said first rear pulley 241.

Likewise said second belt 26 comprises a smooth internal portion, which slides on said second front pulley 232 and on the smooth portion $242_a$ of said second rear pulley 242, and an external toothed portion engaged on the toothed portion $242_b$ of said second rear pulley 242.

With reference in particular to FIG. 2, in a first embodiment of said gymnastic machine 1, said sliding belt 22 is moved by said electric motor 3, axially coupled to said rear transmission assembly 24, and in particular to said rear shaft 243.

Alternatively, without forsaking the scope of protection of the present invention, said electric motor 3 can also be coupled to said front transmission assembly 23.

Said electric motor 3 is of axial or axial flow type. By axial electric motor is meant a motor the magnetic flow of which "flows" parallel to the axis di rotation of the rotor. In effect, in radial electric motors, the vector of the magnetic flow, obviously variable over time, is directed perpendicularly to the axis of rotation of the rotor.

Generally, from the structural point of view, the axial electric motors also comprise at least a fixed stator element and at least a rotor element which rotates with respect to the stator.

The electric coils are arranged and wound on the stator, while permanent magnets are arranged on the rotor.

In axial electric motors the magnetic field flow is directly parallel with respect to the axis of symmetry and rotation of the motor.

The surfaces useful for the generation of drive torque, i.e. the surfaces where the electric coils and permanent magnets are arranged, are perpendicular to the axis of the motor.

Figure 3:
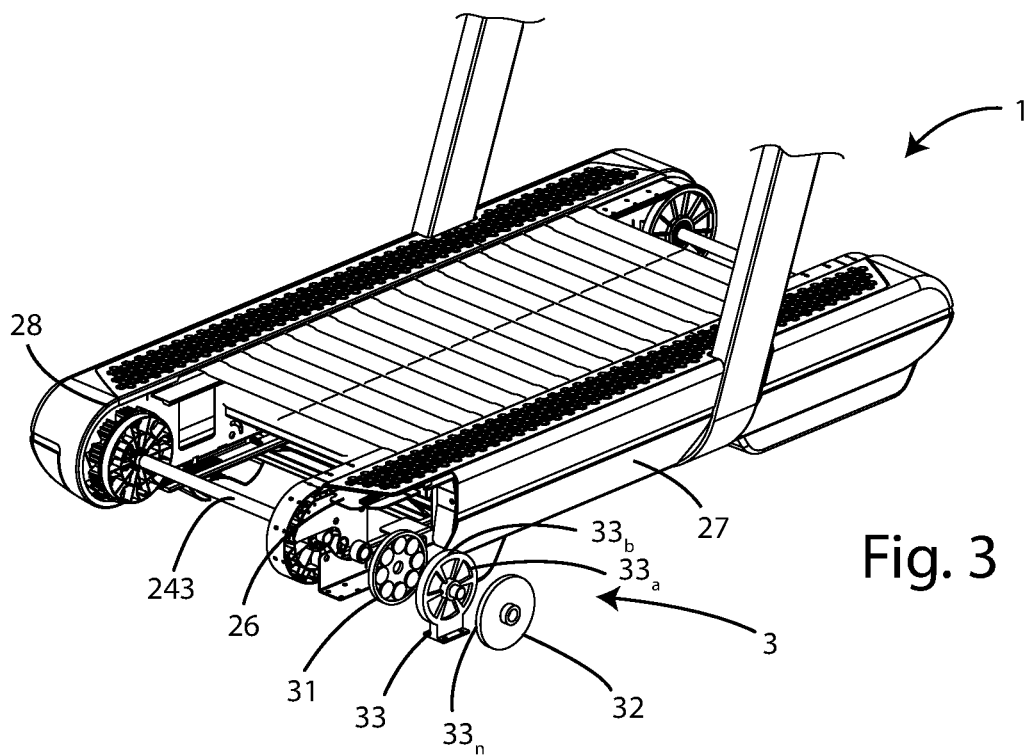
FIG. 3 shows an exploded side view of the axial motor shown in FIG. 2.

It is possible to provide different embodiments for an axial electric motor 3. In the particular embodiment described in the present invention, with reference to FIGS. 3, 4 and 5, the axial electric motor 3 comprises a first rotor 31, a second rotor 32 and a stator 33 arranged between said first 31 and second 32 rotor.

Said stator 33, which has a central hole 331, is fixed to said frame 21, and in particular a lateral longitudinal member 27, as better described in the following, by means of fixing organs, and comprises a plurality of housings $33_a$, $33_b$, ..., $33_n$ for housing the electric coils.

Figure 4:
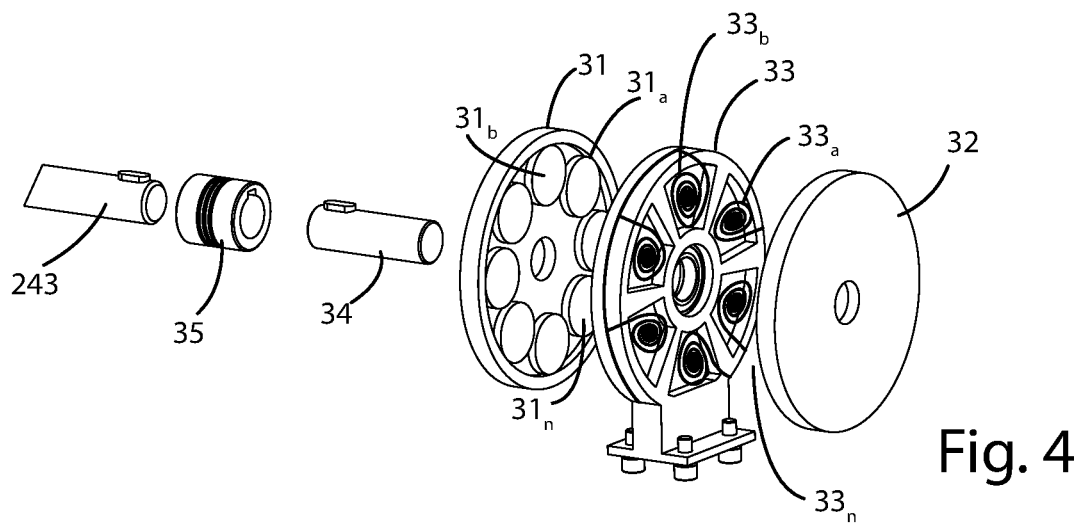
FIG. 4 shows an exploded view of the detail shown in FIG. 2.

With reference to FIG. 4, said first rotor 31 comprises a plurality of permanent magnets $31_a$, $31_b$, ..., $31_n$, alternated with south and north polarities, and likewise, said second rotor 32 comprises a plurality of permanent magnets $32_a$, $32_b$, ..., $32_n$, alternated with south and north polarities.

Without forsaking the scope of protection of the present invention, said plurality of permanent magnets can be arranged differently.

Said first rotor 31 said second rotor 32 and stator 33 are arranged superposed. Said first rotor 31 and second rotor 32 are further keyed to the drive shaft 34, for example by means of a forced coupling.

Said drive shaft 34 is rotatably coupled with said stator 33, for example by means of a bearing in correspondence with the central hole 331.

Said drive shaft 34 is coupled to said rear shaft 243 by means of shape couplings or by means of a torque joint 35 so that they are solidly constrained to one another.

When the electric coils of said stator 33 are powered, the electromagnetic field generated interacts with said plurality of permanent magnets 31a, 31b, ..., 31n of said first rotor and with said plurality of permanent magnets 32a, 32b, ..., 32n of said second rotor 32, generating prevalently axial lines of magnetic field, parallel to the axis of extension or longitudinal axis of said rear shaft 243, thus generating a drive torque which sets said first 31 and second rotor 32 in rotation, which in turn set said torque joint 35 and said rear shaft 243 in rotation.

Figure 5:
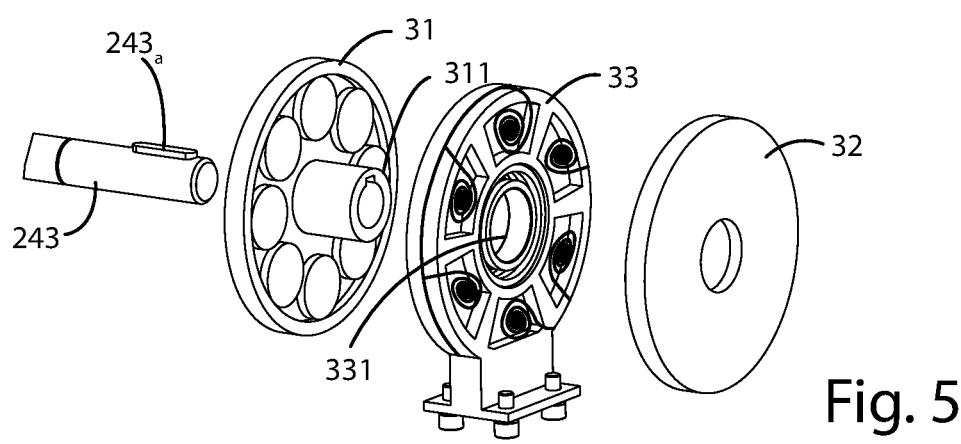
FIG. 5 shows an exploded side view of the axial motor shown in FIG. 2.

With reference to FIG. 5, it is also possible to provide a common shaft between said axial electric motor 3 and the rear transmission assembly 24.

In particular, an end of said rear shaft 243 passes through said first rotor 31, stator 33 and second rotor 32, and is keyed to said first rotor 31 by hooking means such as a tab $243_a$ which inserts in a grooved body 311 or hub, solidly constrained to said first rotor 31.

Said stator 33 is fixed to said frame 21 and in particular to one of said lateral longitudinal members 27 or 28, and is thus coupled to said hub 311, for example by means of a bearing, so that said hub 311 can rotate.

Said second rotor 32 is keyed on said hub 311 of the first rotor 31 so that, when said applied drive torque sets said first rotor 31 and second rotor 32 in rotation, the rotors rotate solidly with said hub 311 and said rear shaft 243.

Figure 6:
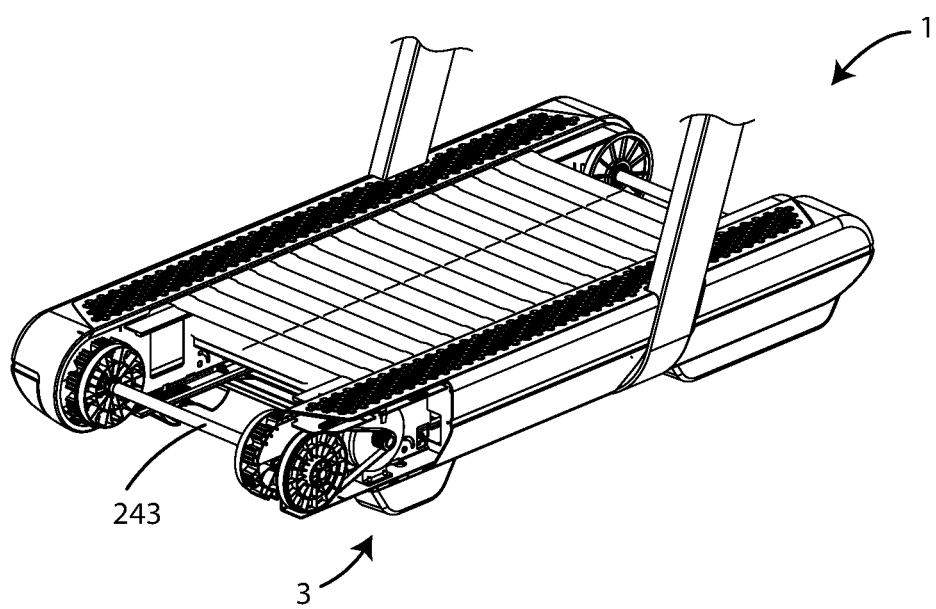
FIG. 6 shows an axonometric side view of a second embodiment of the gymnastic machine according to the invention.
Figure 7:
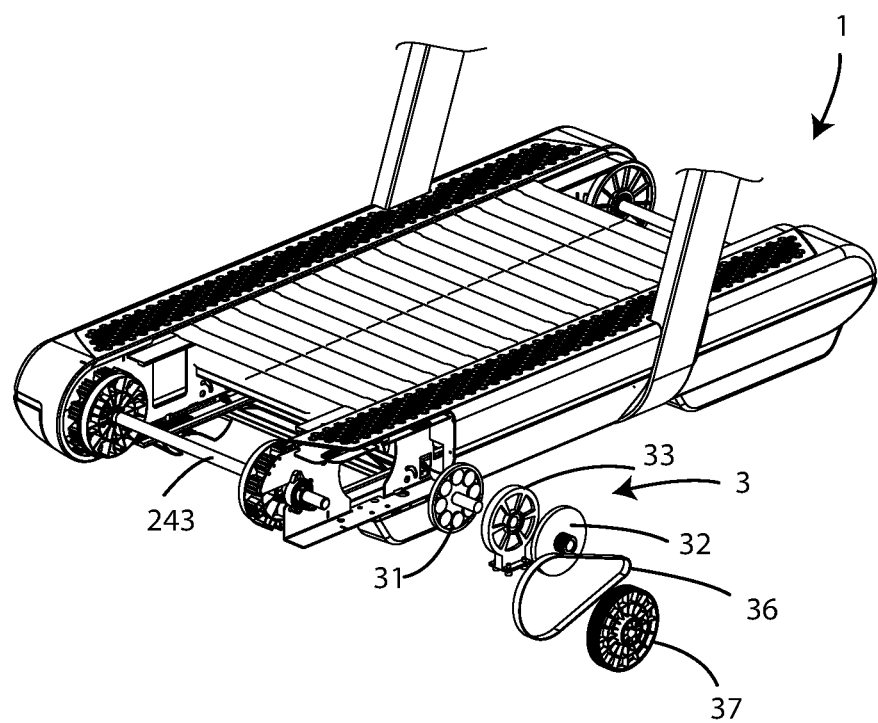
FIG. 7 shows a partially-exploded axonometric side view of the gymnastic machine according to FIG. 6.
Figure 8:
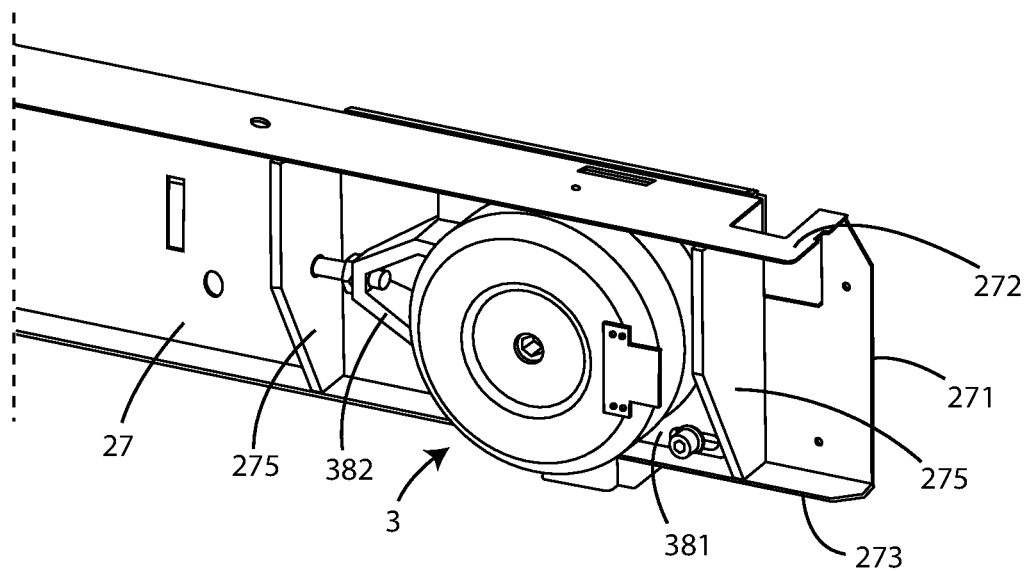
FIG. 8 shows a detail of the assembly of an axial electric motor in a lateral longitudinal member of the gymnastic machine according to FIG. 6.
Figure 9:
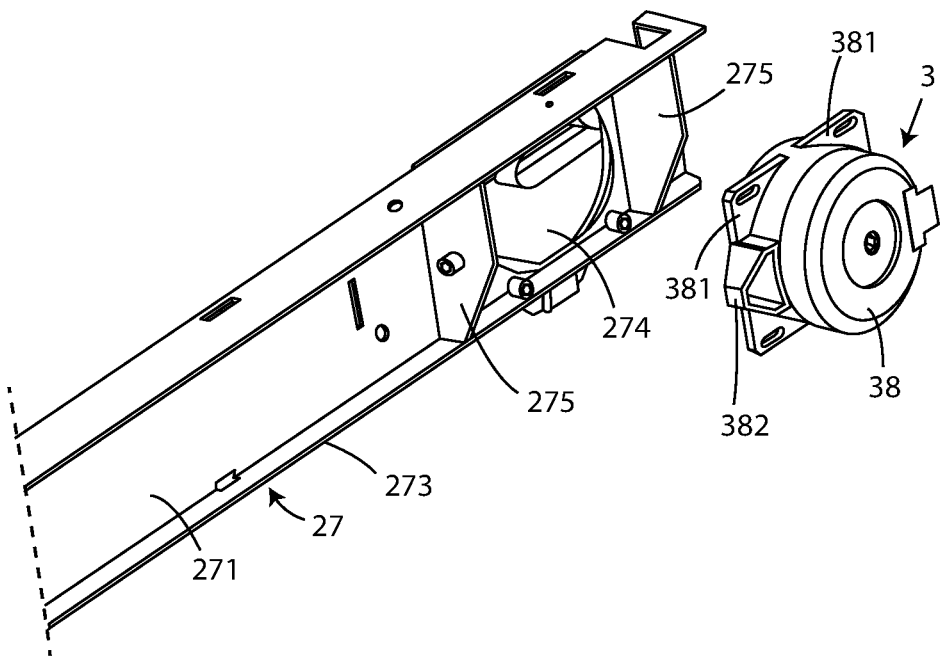
FIG. 9 shows a first partially-exploded axonometric view of the assembly of the axial electric motor in the lateral longitudinal member of the gymnastic machine according to FIG. 6.
Figure 10:
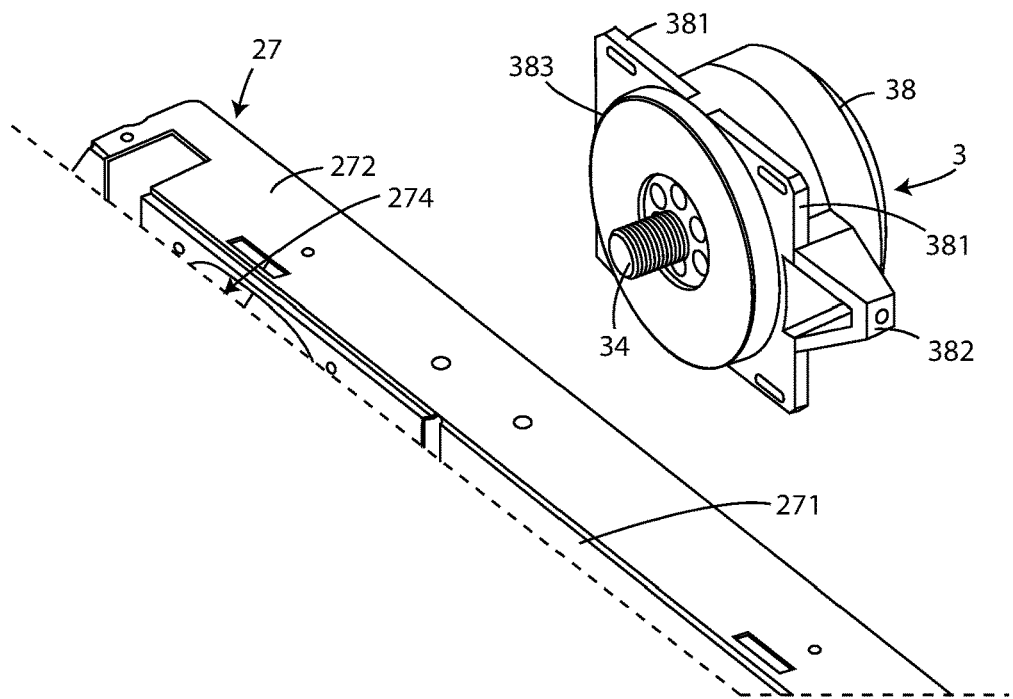
FIG. 10 shows a second partially-exploded axonometric view of the assembly of the axial electric motor in the lateral longitudinal member of the gymnastic machine according to FIG. 6.
Figure 11:
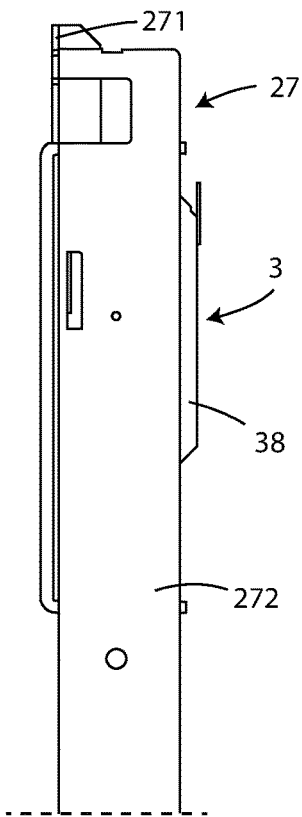
FIG. 11 shows a view from above of the detail shown in FIG. 8.
Figure 12:
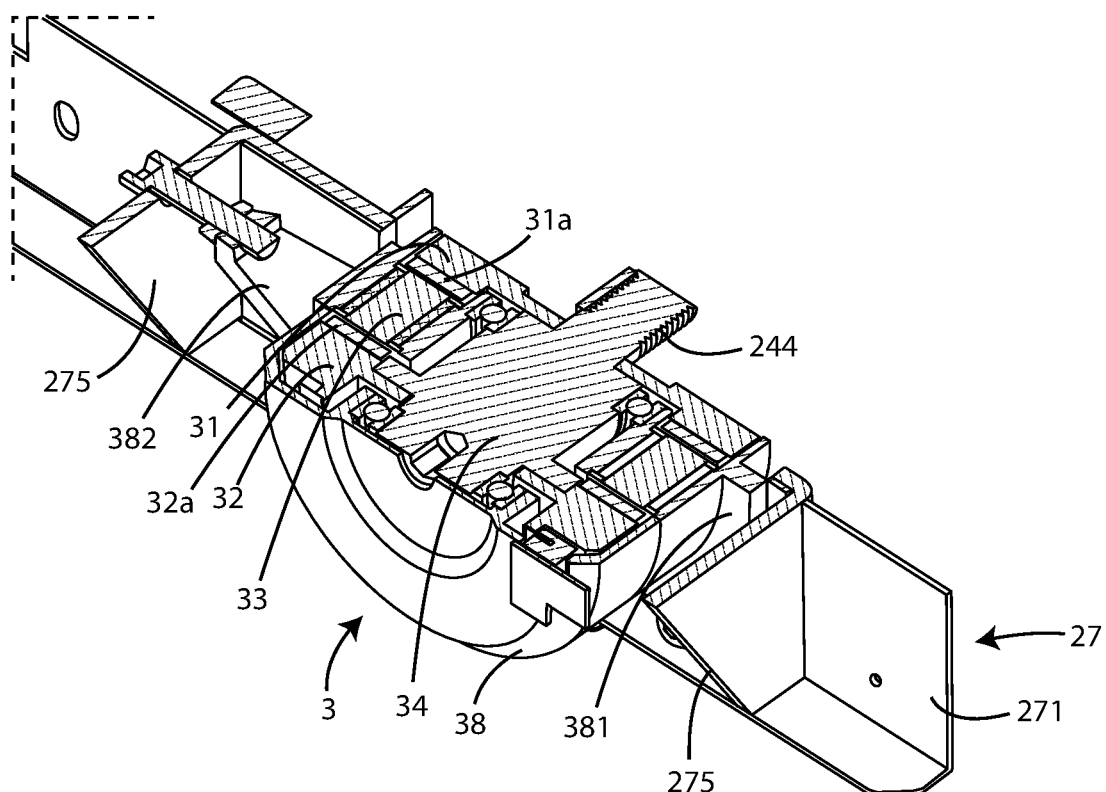
FIG. 12 shows a longitudinal section of the electric motor installed on the lateral longitudinal member of the gymnastic machine according to FIG. 8.
Figure 13:
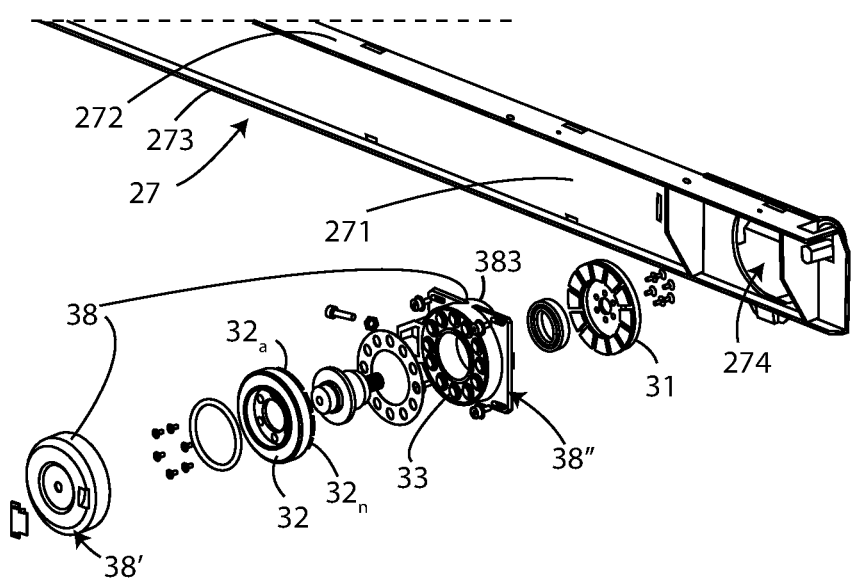
FIG. 13 shows an exploded view of the electric motor arranged at an opening afforded on a lateral longitudinal member.
Figure 14:
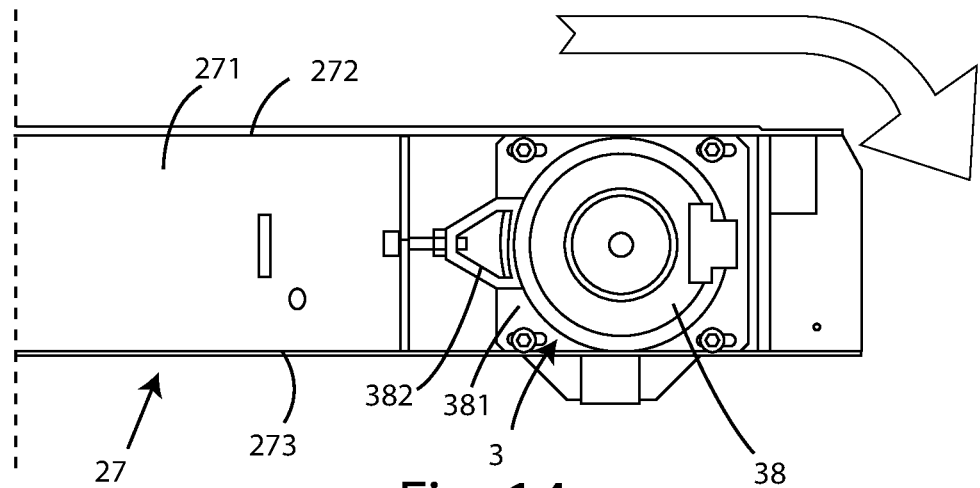
FIG. 14 shows a transparent side view of the detail shown in FIG. 8.

Now with reference to FIGS. 6 and 7, a second embodiment is shown of the gymnastic machine 1, wherein the coupling between said axial electric motor 3 and said rear transmission assembly 24 takes place by means of a transmission assembly or transmission means, i.e. by means of a transmission belt 36 and a transmission pulley 37.

Said transmission pulley 37 is solidly coupled to said rear shaft 243.

Said transmission pulley 37 and axial electric motor 3 are connected to one another by said transmission belt 36.

FIGS. 8-14 show a preferred embodiment that relates to the installation of the axial electric motor 3 in the gymnastic machine 1, which enables obtaining an overall reduction of the space.

In particular, the longitudinal member 27 has a vertical wall 271 and two walls 272 and 273 parallel and facing, arranged perpendicular to said vertical wall 271 and forming therewith a substantially C-shaped transversal section.

An opening 274 is afforded on the vertical wall 271, at which the electric motor 3 is arranged and inserted.

In particular, it can be seen the drive shaft 34 having a toothed part to be coupled with a corresponding toothing 244 of the rear shaft 243, by means of the transmission belt 36.

Both rotors 31 and 32 are splined to the drive shaft 34.

Further, said opening 274 is laterally delimited by two supports 275. As the longitudinal members 27 (or 28) are subjected to considerable mechanical stresses during the gymnastic exercises, the arrangement of the electric motor 3 internally of one thereof, for obtaining an overall space saving of the gymnastic machine 1, can cause weakening thereof. Therefore said two supports 275 enable increase the rigidity of the longitudinal member 27.

Further, the electric motor 3 is closed in a die-cast casing 38 made in two parts 38' and 38", also comprising a first flange 381, for fixing the electric motor 3 with screws and corresponding holes obtained on the vertical wall 271 of the respective longitudinal member 27, and a second adjustment lateral flange 382, for adjusting said electric motor 3 with one of said supports 275, for tensioning the transmission belt 36.

This configuration enables fixing the electric motor 3 to the longitudinal member 27. The die-cast casing 38 has a rear circular portion 383 that is cylindrical and has a shape substantially analogue to that of said opening 274 afforded on said vertical wall 271 of said longitudinal member 27.

The coupling modality of the die-cast casing 38 to the relative longitudinal member 27 by means of the first flange 381 has the function of supporting and stiffening the longitudinal member 27, together with the two supports 275.

As can be observed, owing to the smaller volumes of the electric motor 3, it is possible to realise an assembly housed internally of the footprint defined by the so-called "low part" which identifies the travel surface given by the sliding belt 22. In this way it is possible to do without the front hood, where the motor is usually housed.

In fact, to house the electric motor 3 on the flank, instead of in the front part of the gymnastic machine 1, it was necessary to interfere with the "structural continuity" of the lateral longitudinal member 27, by creating the opening 274 on the vertical wall 271, which is required to be rather large, in consideration of the width of the vertical wall 271.

The casing 38 of the electric motor 3 is conformed in such a way that, once fixed to the longitudinal member 27 by means of the flange 381 and respective four screws, the casing 38 "closes" the opening 274, restoring the torsional rigidity of the longitudinal member 27.

The dimensions of said opening 274 enable entering with said rear circular portion 383 in said opening 274, which is located between the longitudinal member 27 and the sliding belt 22.

The coupling of the electric motor 3 to the longitudinal member 27 by means of said casing 38 is called indirect coupling.

With this configuration it is possible to exploit said rear circular portion 383, which has a large diameter, in order to house inertial mass useful in reaching a desired inertia value, by realising thicker rotors and thus, with a given diameter, with greater inertia.

As regards the necessary inertia which must be guaranteed on the gymnastic machine 1 according to the invention, it is known that in order to have a safety stop in the case, for example, of a sudden power failure of the electric motor 3, as well as to make the belt speed variations more gradual, indicating with IR the inertia required by the gymnastic machine 1, with IM the inertia to the motor axis and with t the transmission ratio between the electric motor 3 and the first rear pulley 241, the inertia that the rotors should have is obtained from the formula:

$$IM = \frac{IR}{\tau^2}$$

The greater part of the motor inertia is given by the rotors 31 and 32. This is a novel element, as it enables eliminating any eventual second transmission stage necessary for driving only a flywheel, as with gymnastic machines according to the prior art.

Among other things, in order to maximise the inertia, the rotors 31 and 32 have shape such that the part with the greatest thickness is the part furthest from the axis of rotation. In other words, on the more perimetric portions of the rotors 31 and 32 (i.e. with larger diameters) more mass is distributed, to have greater inertia at the same weight (refer in particular to FIG. 12).

Figure 15:
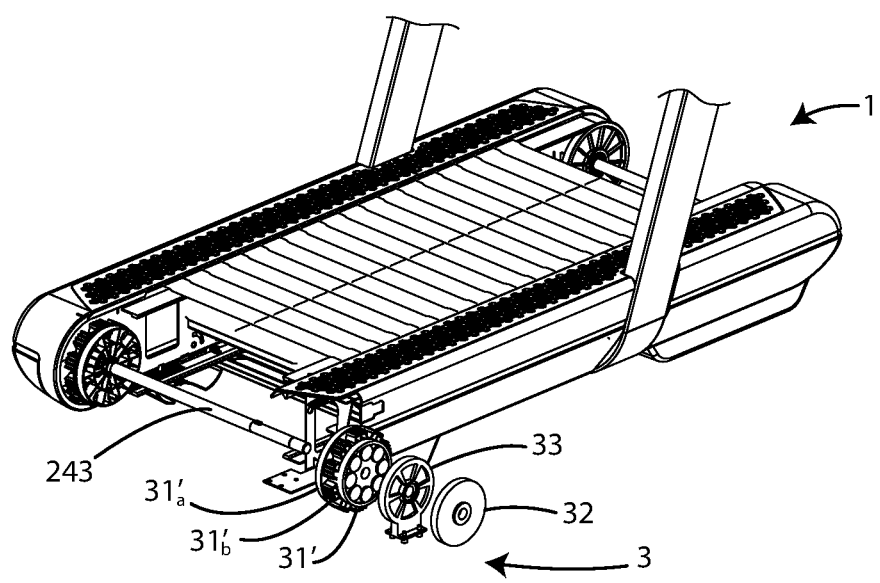
FIG. 15 shows a perspective side view of a third embodiment of the machine of FIG. 1.

Now with reference to FIGS. 15, in a third embodiment of the gymnastic machine 1, the coupling between said axial electric motor 3 and said rear transmission assembly 24 takes place by means of a toothed rotor 31' solidly coupled to said rear shaft 243.

Said toothed rotor 31' has a cogging 31'$_a$, engaged to said second belt 26, flanked to a smooth portion 31'$_b$.

In said third embodiment, therefore, said second rear pulley 242, is replaced by said toothed rotor 31'.

For this third embodiment also, couplings are provided between said rear shaft 243 and said drive shaft 34, by means of a torque joint 35 or by extending said rear shaft 243 in said axial electric motor 3, thus providing said hub 311 and said tab 243$_a$.

This configuration with the toothed rotor 31' enables keeping the dimensions of the gymnastic machine 1 modest, including laterally.

The operation of the improved sliding belt gymnastic machine 1 described above is as follows.

When a user intends to carry out a gymnastic exercise to run or walk, he or she accedes to said gymnastic machine 1, by positioning on said sliding belt 22. On the basis of the type of exercise selected, the sliding belt 22 moves, driven by the axial electric motor 3 which sets the rear shaft 243 in rotation.

The rotation of said rear shaft 243 sets the front shaft 233 in rotation by means of said first belt 25 and second belt 26.

In the first embodiment of the gymnastic machine 1, the current flowing in the electric coils of the stator 33 induces a magnetic field which interacts with the plurality of permanent magnets 31$_a$, 31$_b$, ..., 31$_n$ of said first rotor 31 and the plurality of permanent magnets 32$_a$, 32$_b$, ..., 32$_n$ of said second rotor 32 which thus begin rotating.

In particular, when the electric coils of said stator 33 are powered, the electromagnetic field generated interacts with said plurality of permanent magnets 31$_a$, 31$_b$, ..., 31$_n$ of said first rotor and with said plurality of permanent magnets 32$_a$, 32$_b$, ..., 32$_n$ of said second rotor 32, creating prevalently axial lines of magnetic field, parallel to the axis of extension of said rear shaft 243, thus creating a drive torque which sets said first 31 and second rotor 32 in rotation.

When said first 31 and second 32 rotor rotate, they set said torque joint 35 in rotation, which in turn sets said rear shaft 243 in rotation.

In the coupling by means of said tab 243$_a$, as described in the foregoing, the drive torque exerted sets the first rotor 31 and second rotor 32 in rotation, and the latter rotate solidly with said hub 311 and said rear shaft 243.

Consequently, also the first rear pulley 241 and second rear pulley 242 rotate, causing said first belt 25 and second belt 26 to slide, which transmit the drive to said front transmission assembly 23.

In the second embodiment of the gymnastic machine 1, the movement of said first rotor 31 and second rotor 32, caused by said drive torque, set the transmission pulley 37 in rotation by means of the transmission belt 36.

The rotation of said transmission pulley 37 causes the rotation of said rear shaft 243, which transmits the drive to the other elements as described for the first embodiment.

The functioning of the gymnastic machine 1 according to the third embodiment is alike to the functioning of the first embodiment.

The axial electric motor 3 with the structure described with reference to FIGS. 8-14, can be conveniently installed in the first, second and third embodiments described above, installing it in the respective structure of the longitudinal member 27, according to different operating modes.

For example, rotors 31 and 32 or at least one of them in FIG. 4 may have a shape such that the part with the greatest thickness and mass is the part furthest from the rotation axis (i.e. furthest from the centre), so as to have greater inertia at the same weight. This has the advantage of eliminating a second stage of transmission necessary to set in motion a flywheel, as in gymnastic machines according to the prior art.

As is clear from the above description, said improved gymnastic machine with sliding belt comprises an axial electric motor which enables a reduction of the volume of the machine and lower wear.

The axial electric motor present in the machine object of the invention is characterised by high efficiency, even at low revolutions, providing high drive torques, so that it can be directly coupled to the rear shaft or the front shaft.

The axial electric motor enables obtaining high specific drive torque, even with smaller dimensions/volume as the active parts are located close to the external circumference and therefore distant from the rotation axis.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. A gymnastic machine comprising
a base structure having a front transmission assembly and a rear transmission assembly, wherein said base structure comprises two lateral longitudinal members between which a sliding belt slides,
the sliding belt, associated to said base structure, configured for a user to perform a gymnastic exercise, wherein said sliding belt is configured to rotate by means of said front transmission assembly and said rear transmission assembly according to a sliding direction, wherein said sliding belt is arranged between said two lateral longitudinal members; and
an electric motor, having at least one stator and at least one rotor, said electric motor being kinematically coupled to said front transmission assembly, or to said rear transmission assembly, for moving said sliding belt,
wherein said electric motor is of axial flow type, wherein a magnetic field flow is directed to be parallel with respect to an axis of the electric motor,
wherein said at least one rotor is provided with a smooth portion and a toothed portion for coupling with said sliding belt.

2. The gymnastic machine according to claim 1, wherein the at least one stator is directly or indirectly fixed to one of the two lateral longitudinal members.

3. The gymnastic machine according to claim 1, wherein said at least one stator comprises a plurality of electric coils and
said electric motor comprises a drive shaft rotatably coupled to the at least one stator.

4. The gymnastic machine according to claim 3, wherein said at least one rotor comprises a first rotor, provided with a plurality of permanent magnets, keyed to said drive shaft, and a second rotor, provided with a plurality of permanent magnets, keyed to said drive shaft.

5. The gymnastic machine according to claim 4, wherein said rear transmission assembly comprises a rear shaft and said first rotor is coupled to said rear shaft.

6. The gymnastic machine according to claim 5, wherein said rear transmission assembly comprises the drive shaft which is coupled to said rear shaft by a torque joint or shape couplings.

7. The gymnastic machine according to claim 4, wherein said first rotor and said second rotor are keyed on said drive shaft and said at least one stator is arranged between said first rotor and second rotor.

8. The gymnastic machine according to claim 4, wherein
said first rotor comprises a hub for coupling between a rear shaft of said rear transmission assembly and said electric motor, and
wherein said second rotor is keyed on said hub.

9. The gymnastic machine according to claim 1, further comprising a transmission means for transmission of the drive of said electric motor to said rear transmission assembly.

10. The gymnastic machine according to claim 9, wherein
said rear transmission assembly comprises a rear shaft and said transmission means comprise a transmission belt and a transmission pulley, solidly coupled to said rear shaft.

11. The gymnastic machine according to claim 1, wherein said electric motor is installed at an opening in a vertical wall of one of said two lateral longitudinal members.

12. The gymnastic machine according to claim 11, wherein said one of said two lateral longitudinal members comprises two supports arranged on the sides of said opening.

13. The gymnastic machine according to claim 12, wherein said electric motor comprises a casing, having a first flange, for fixing said electric motor to said vertical wall.

14. The gymnastic machine according to claim 12, comprising a lateral adjustment second flange, for the adjustment of the position of said electric motor with respect to one of said two supports.

15. The gymnastic machine according to claim 12, wherein a rear portion of said electric motor is inserted through said opening afforded on said vertical wall of said one of said two lateral longitudinal members.

16. The gymnastic machine according to claim 1, wherein said at least one rotor has a greater mass in a perimeter portion, to increase inertia.

* * * * *